(12) United States Patent
Dietl

(10) Patent No.: US 7,529,792 B2
(45) Date of Patent: May 5, 2009

(54) METHOD AND APPARATUS FOR SELECTING A RENDERER

(75) Inventor: Josef Dietl, Neulussheim (DE)

(73) Assignee: SAP Aktiengesellschaft, Walldorf (DE)

( * ) Notice: Subject to any disclaimer, the term of this patent is extended or adjusted under 35 U.S.C. 154(b) by 1127 days.

(21) Appl. No.: 10/698,059

(22) Filed: Oct. 29, 2003

(65) Prior Publication Data

US 2004/0143627 A1  Jul. 22, 2004

(30) Foreign Application Priority Data

Oct. 29, 2002  (EP) ................... 02024435

(51) Int. Cl.
*G06F 15/16* (2006.01)
(52) U.S. Cl. .............................. 709/203; 709/201
(58) Field of Classification Search .............. 709/201, 709/203
See application file for complete search history.

(56) References Cited

U.S. PATENT DOCUMENTS

| | | | | |
|---|---|---|---|---|
| 6,029,196 | A * | 2/2000 | Lenz ........................... | 709/221 |
| 6,560,604 | B1 * | 5/2003 | Fascenda ..................... | 707/10 |
| 7,260,380 | B2 | 8/2007 | Dietl et al. | |
| 7,269,784 | B1 * | 9/2007 | Kasriel et al. ............... | 715/205 |
| 7,340,718 | B2 | 3/2008 | Szladovics et al. | |
| 2002/0010716 | A1 | 1/2002 | McCartney et al. | |
| 2002/0103858 | A1 | 8/2002 | Bracewell et al. | |
| 2002/0178004 | A1 * | 11/2002 | Chang et al. ................ | 704/246 |
| 2004/0123273 | A1 | 6/2004 | Hammerich et al. | |
| 2004/0128612 | A1 | 7/2004 | Dietl | |
| 2004/0223009 | A1 | 11/2004 | Szladovics et al. | |
| 2005/0021537 | A1 | 1/2005 | Brendle et al. | |
| 2005/0021557 | A1 | 1/2005 | Brendle et al. | |
| 2005/0022163 | A1 | 1/2005 | Brendle et al. | |
| 2005/0071785 | A1 | 3/2005 | Chadzelek et al. | |
| 2005/0091276 | A1 | 4/2005 | Brunswig et al. | |
| 2005/0132195 | A1 | 6/2005 | Dietl | |
| 2005/0132196 | A1 | 6/2005 | Dietl | |
| 2005/0136979 | A1 | 6/2005 | Dietl et al. | |
| 2006/0150110 | A1 | 6/2006 | Dietl et al. | |

(Continued)

FOREIGN PATENT DOCUMENTS

EP  1 115071 A1  7/2001

OTHER PUBLICATIONS

Communication EPO Form 1507.0 (03.95) (1 page); European Search Report (1 page); and Annex to the European Search Report (1 page), all mailed on Jun. 5, 2003 in EP Patent Application No. 02024435.6-2201. (Total 3 pages).

(Continued)

*Primary Examiner*—Nathan J Flynn
*Assistant Examiner*—Mohamed Wasel
(74) *Attorney, Agent, or Firm*—Fish & Richardson P.C.

(57) ABSTRACT

Methods and apparatus, including computer program products, are used to select a renderer. A client identifier is received that identifies a client. The client identifier is a string that is compared with each of one or more client templates, where each client template is associated with one of a plurality of renderers. A score is generated for each comparison, the score reflecting the similarity between the client identifier and the client template. Based on the score, a renderer is selected from the plurality of renderers for use in communication with the client.

11 Claims, 2 Drawing Sheets

U.S. PATENT DOCUMENTS

| | | | |
|---|---|---|---|
| 2006/0156006 A1 | 6/2006 | Dietl et al. | |
| 2006/0150075 A1 | 7/2006 | Dietl et al. | |
| 2006/0150084 A1 | 7/2006 | Dietl et al. | |
| 2006/0248538 A1 | 11/2006 | Dietl et al. | |
| 2007/0118796 A1* | 5/2007 | Nazem et al. | 715/513 |
| 2007/0277042 A1 | 11/2007 | Dietl | |
| 2008/0022111 A1 | 1/2008 | Dietl | |

OTHER PUBLICATIONS

Communication pursuant to Article 96(2) EPC (1 page); EPO Form 2906 01.91 CSX (3 pages); European Search Report (1 page); and Annex to the European Search Report; all mailed on Sep. 28, 2004 in EP 02024435.6-2201. (Total 6 pages).

Provision of the minutes in accordance with Rule 124(4) EPC (1 page); EPO Form 20091.1 Minutes of the oral proceedings before the Examining Division (6 pages); all mailed on Mar. 5, 2008 in EP Patent Application No. EP 02024435.6-2201 (Total 7 pages).

Decision to refuse a European Patent Application (1 page); Registered Letter with advice of delivery (1 page); EPA Form 2916 12.07CSX (Grounds for Decision Annex) (6 pages); EPO Form 2019 12.07 CSX (Means of Redress) (2 pages); Annex to Communication (Claims—Main Request) (2 pages); Claims—First Auxiliary Request (2 pages); EPO Form 2906 01.91CSX (Annex to Communication) (4 pages); all mailed on Mar. 5, 2008 in EP Patent Application No. 02024435.6-2201 (Total 18 pages).

Summons to Attend Oral Proceedings pursuant to Rule 71(1) EPC (1 page); EP Form 2906 01.91 CSX, Communication/Minutes (Annex) (4 pages); and EPO Form 2040 Preparation for Oral Proceedings—Instructions to Support Services (2 pages); all mailed on Jul. 18, 2007 in EP Application No. 02024435.6 (Total 7 Pages).

* cited by examiner

METHOD AND APPARATUS FOR SELECTING A RENDERER

CROSS-REFERENCE TO RELATED APPLICATIONS

This application claims priority to European Patent Application No. 02024435.6 for Scoring Algorithm, filed Oct. 29, 2002.

BACKGROUND

The present invention relates to data processing by digital computer, and more particularly to selecting a renderer.

Client-server applications typically have two components: a server or back-end component that provides the application logic, and a client or front-end component that renders a user interface through which a user interacts with the application. The server computer can have resources that provide high computational and communication bandwidth, for example, so that it can execute multiple applications that interact with numerous clients. The client component can be executed on a separate computer, although in some instances the server component and the client component may be executed on the same computer.

In a heterogeneous system landscape, the server may need to serve a variety of different types of clients that use different types of software to communicate with the server. For example, clients may use different types of browsers (e.g., Netscape, Internet Explorer), or different versions of a particular browser, with different feature sets.

SUMMARY OF THE INVENTION

The present invention provides methods and apparatus, including computer program products, for selecting a renderer. The techniques include receiving a client identifier that identifies a client; comparing the client identifier with each of one or more client templates, each client template being associated with a renderer in a plurality of renderers; generating a score for each comparison, the score reflecting the similarity between the client identifier and the client template, and based on the score, selecting a renderer from the plurality of renderers for use in communication with the client.

Implementations of the invention can include one or more of the following features. Tscore can be one of at least three different possible scores. Each score is generated by computing a number of matching characters in a client template divided by a number of characters in the client identifier.

The renderer is selected based on the highest generated score. The renderer is selected based on the first generated score that meets or exceeds a minimum score. The renderer is selected based on first generated score that meets the maximum score. The client identifier is a user agent identifier that identifies a Web browser running on the client.

The invention can be implemented to realize one or more of the following advantages.

The server can, with greater efficiency, select a renderer that matches a specific client. The use of scoring eliminates the need for constant maintenance to insure the correct functioning of the server and the need to provide for a specific renderer for every client. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
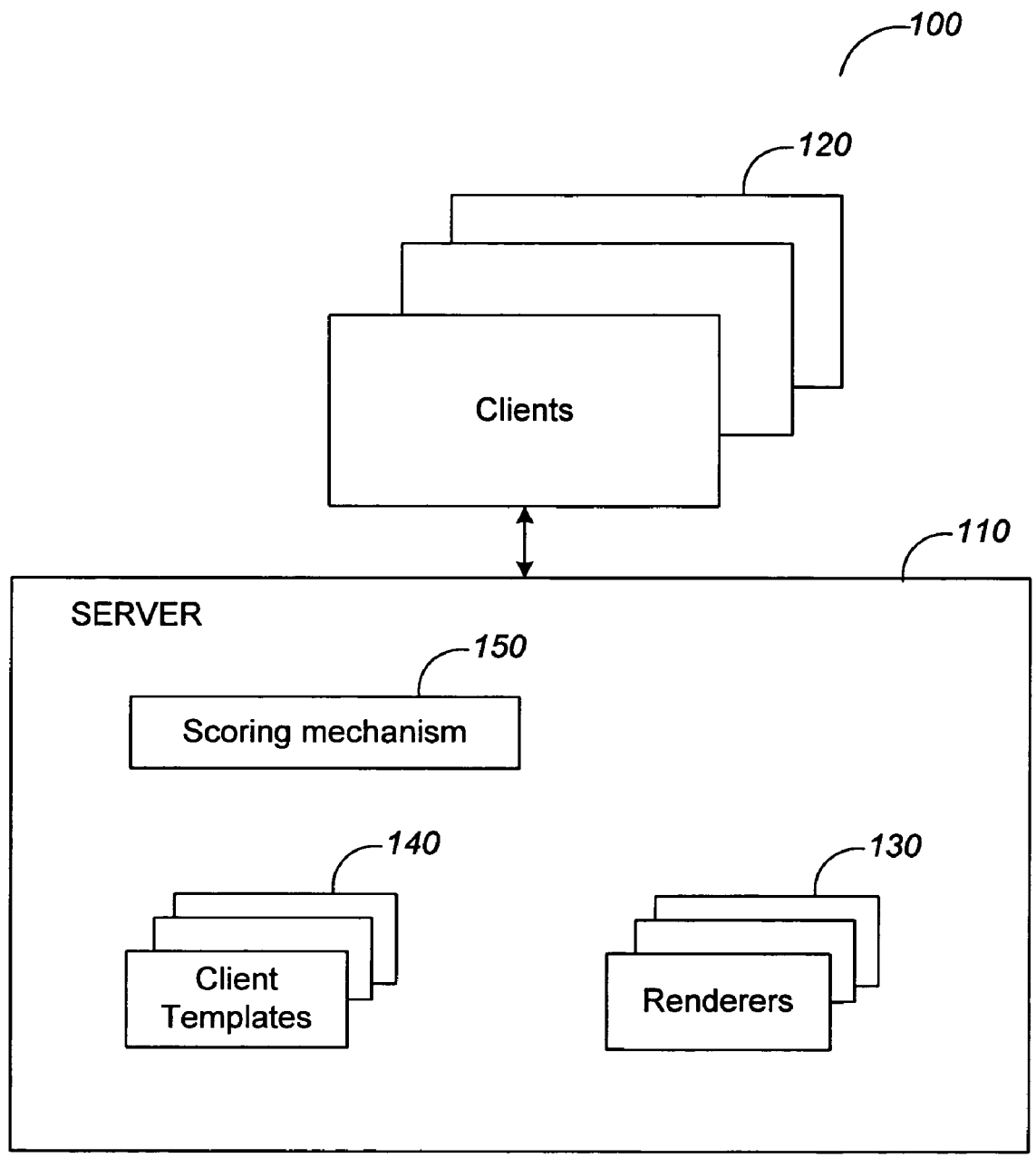
FIG. 1 is a block diagram of a system in accordance with the invention.

As shown in FIG. 1, a system 100 for selecting a renderer in accordance with the invention includes a server 10 that serves multiple clients 120. In one implementation, the server is a Web server that serves Web pages to a Web browser running on the client.

The server includes multiple renderers 130. A renderer produces code that can be used to render a user interface on the client. For example, in the Web implementation described above, the renderer produces HTML code according to a particular HTML standard that is supported by the particular Web browser running on the client. Each renderer produces HTML code according to a different HTML standard.

The server also includes multiple client templates 140 stored, for example, in a table. Each client template is associated with one of the stored renderers and identifies one or more clients, or types of client. The following are examples of client templates represented in a string format.

(1) "Mozilla/5.0 (*) * Netscape6/*", (where * represents a wildcard character)

(2) "Mozilla/5.0 (Windows; U; Windows NT 5.0; en-US; rv:0.9.4.1) Gecko/20020508 Netscape6/6.2.3"

In the first example, the client template identifies all Netscape browsers of the 6 series release. In the second example, the client template identifies a particular Netscape browser of the 6 series release, in this case the Netscape 6.2.3 browser. The invention is not limited to the two examples shown here—any client or client type can be named in the client template.

Figure 2:
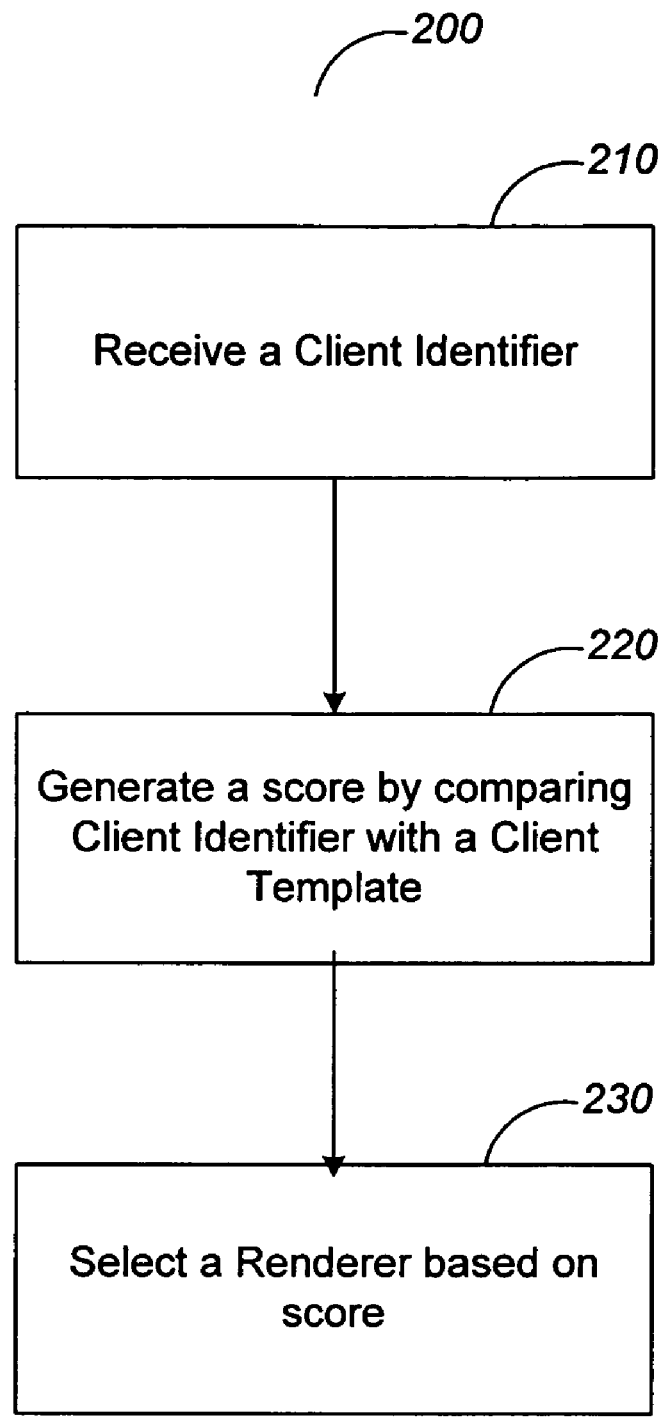
FIG. 2 is a flow diagram of a method in accordance with the invention.

The server 110 also includes a scoring mechanism 150 that uses a scoring technique to select a renderer 130 to use with a particular client 120. During system operation, as shown in FIG. 2, the scoring mechanism 150 receives a client identifier that identifies a client (step 210). In one implementation, the client identifier is a user agent identifier that is included within an HTTP (Hypertext Transfer Protocol) request received from a Web browser running on the client. The user agent identifier is a parameter that is included in the header of an HTTP request and that identifies the type of browser (e.g., Internet Explorer, Netscape).

The scoring mechanism 150 compares the received client identifier with one or more of the stored client templates and generates a score based on the comparison (step 220). The score reflects the similarity between the client identifier and the client template. For example, a higher score can indicate a better match or conformity, and a lower score can indicate a lesser match or conformity. In one implementation, the score is a range of values between 0 and 1 or a range of percentages between 0% and 100% inclusive. A maximum score (e.g., 100% or 1) indicates a complete match.

In one implementation, the comparison involves comparing a received user agent string with a stored browser template string. The score is computed as the number of matching characters in the template (excluding wildcard characters) divided by the number of characters in the user agent string. For example, the comparison of the user agent string "Netscape 6.03" with a first client template "Netscape 6.03" would produce a score of 1 (or 100%), as all characters of the string match. The comparison of the same user agent string with a second client template "Netscape 6*" delivers a score of 10/13 (or 77%) as only 10 characters of the template fit match the 13 characters of the user agent string.

Based on the determined scores, the scoring mechanism 150 selects a renderer to use with the client (step 230). Preferably, a selection is made in two comparisons or fewer. The selection is performed according to a selection algorithm. One selection algorithm selects the renderer associated with the template that produced the highest score. A second selection algorithm selects the renderer associated with the first template whose score matches or exceeds a predetermined minimum score. This algorithm, may, in some cases, be faster than the first algorithm. A third algorithm selects the renderer associated with the first template whose score is the maximum score; if no template achieves the maximum score, then a default renderer is selected. In one implementation, tied scores are resolved arbitrarily in favor of one of the templates.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer-readable storage medium storing a computer program for selecting a renderer, the computer program operable when executed to:
   receive a client identifier string that identifies a client;
   compare the client identifier string with each of one or more client templates, each client template being associated with a renderer in a plurality of renderers;
   generate a score for each comparison, the score reflecting the similarity between the client identifier string and the client template, wherein each score is generated by computing a number of matching characters in the client template divided by a number of characters in the client identifier string, wherein the score is one of at least three different possible scores; and
   select, based on the highest generated score, a renderer from the plurality of renderers for use in communication with the client.

2. The computer-readable storage medium of claim 1, wherein the renderer is selected based on the first generated score that meets or exceeds a minimum score.

3. The computer-readable storage medium of claim 1, wherein the renderer is selected based on the first generated score that meets the maximum score.

4. The computer-readable storage medium of claim 1, wherein the client identifier string is a user agent identifier that identifies a Web browser running on the client.

5. A computer implemented method for selecting a renderer, the method comprising:
   receiving a client identifier string that identifies a client;

comparing the client identifier string with each of one or more client templates, each client template being associated with a renderer in a plurality of renderers;

generating a score for each comparison, the score reflecting the similarity between the client identifier string and the client template, wherein each score is generated by computing a number of matching characters in the client template divided by a number of characters in the client identifier string, wherein the score is one of at least three different possible scores, and selecting, based on the highest generated score, a renderer from the plurality of renderers for use in communication with the client.

6. The method of claim 5, wherein the renderer is selected based on the first generated score that meets or exceeds a minimum score.

7. The method of claim 5, wherein the renderer is selected based on the first generated score that meets the maximum score.

8. The method of claim 5, wherein the client identifier string is a user agent identifier that identifies a Web browser running on the client.

9. An apparatus for selecting a renderer, the apparatus comprising:

means for receiving a client identifier string that identifies a client;

means for comparing the client identifier string with each of one or more client templates, each client template being associated with a renderer in a plurality of renderers;

means for generating a score for each comparison, the score reflecting the similarity between the client identifier string and the client template, wherein the means for generating each score includes means for generating each score by computing a number of matching characters in the client template divided by a number of characters in the client identifier string, wherein the score is one of at least three different possible scores; and means for selecting, based on the highest generated score, a renderer from the plurality of renderers for use in communication with the client.

10. The apparatus of 9, wherein the renderer is selected based on the first generated score that meets or exceeds a minimum score.

11. The apparatus of 9, wherein the renderer is selected based on the first generated score that meets the maximum score.

* * * * *

UNITED STATES PATENT AND TRADEMARK OFFICE
CERTIFICATE OF CORRECTION

PATENT NO. : 7,529,792 B2  
APPLICATION NO. : 10/698059  
DATED : May 5, 2009  
INVENTOR(S) : Josef Dietl Page 1 of 1

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (1127) days Delete the phrase "by 1127 days" and insert -- by 1071 days --

Signed and Sealed this

Twenty-ninth Day of September, 2009

David J. Kappos
*Director of the United States Patent and Trademark Office*